United States Patent [19]

Klier et al.

[11] Patent Number: 5,021,233

[45] Date of Patent: Jun. 4, 1991

[54] WATER GAS SHIFT REACTION WITH ALKALI-DOPED CATALYST

[75] Inventors: Kamil Klier, Bethlehem; Richard G. Herman, Whitehall; Gamimi A. Vedage, Bethlehem, all of Pa.

[73] Assignee: Lehigh University, Bethlehem, Pa.

[21] Appl. No.: 371,425

[22] Filed: Jun. 26, 1989

Related U.S. Application Data

[60] Division of Ser. No. 135,571, Dec. 27, 1987, Pat. No. 4,843,101, which is a continuation of Ser. No. 70,593, Jul. 7, 1987, abandoned, which is a continuation of Ser. No. 919,592, Oct. 17, 1986, abandoned, which is a continuation of Ser. No. 759,494, Jul. 26, 1985, abandoned, which is a continuation of Ser. No. 558,366, Dec. 5, 1983, abandoned, which is a continuation-in-part of Ser. No. 500,073, Jun. 1, 1983, Pat. No. 4,480,131.

[51] Int. Cl.$^5$ .............................. C01B 3/16
[52] U.S. Cl. ..................................... 423/656
[58] Field of Search ............... 502/343, 345; 423/656, 423/655

[56] References Cited

U.S. PATENT DOCUMENTS

| | | | |
|---|---|---|---|
| 3,303,001 | 2/1967 | Dienes | 423/656 |
| 3,922,337 | 11/1975 | Campbell et al. | 423/656 |
| 4,305,842 | 12/1981 | Asakawa et al. | 502/343 X |
| 4,668,656 | 5/1987 | Hardman et al. | 502/345 X |

*Primary Examiner*—W. J. Shine
*Attorney, Agent, or Firm*—Ratner & Prestia

[57] ABSTRACT

The present invention concerns a process for carrying out the water gas shift reaction in the presence of carbon monoxide and water in contact with an alkali-doped catalyst.

1 Claim, No Drawings

WATER GAS SHIFT REACTION WITH ALKALI-DOPED CATALYST

INTRODUCTION

This is a division of application Ser. No. 135,571 filed Dec. 27, 1987, now U.S. Pat. No. 4,843,101, which is a continuation of application Ser. No. 070,593 filed July 7, 1987, now abandoned, which is a continuation of application Ser. No. 919,592 which was filed Oct. 17, 1986, now abandoned which is a continuation of application Ser. No. 759,494 which was filed July 26, 1985, now abandoned, which is a continuation of application Ser. No. 558,366 which was filed Dec. 5, 1983, now abandoned, which is a continuation in part of application Ser. No. 500,073 which was filed June 1, 1983 and which issued as U.S. Pat. No. 4,480,131 on Oct. 30, 1984.

This invention relates to an improved catalyst and method for the production of methanol. More particularly it is concerned with the preparation of stable highly active catalysts for producing methanol by a catalytic reaction from binary or ternary synthesis gas mixtures.

BACKGROUND OF THE INVENTION

It has been reported that ternary copper/zinc oxide catalyst can be utilized for the synthesis of methanol from ternary $H_2/CO/CO_2$ synthesis gas mixtures (Herman, et al., *J. Catal.* (1979), 56, 407 and Klier, *Adv. Catal.* (1982), 31, 243). It is well known to use as the third component Of the ternary catalyst, chromium (Davies, et al., U.S. Pat. No. 3,326,956; Brocker, German Patent 2,116,949) or aluminum (Brocker, German Patent 2,056,612; Cornthwaite, British Patent 1,296,212; Collins, German Patent 2,302,658; Casey et al., U.S. Pat. No. 3,790,505). It is also possible to prepare the Cu/ZnO catalyst in such a way that an active catalyst without the third component results (Stiles, U.S. Pat. No. 4,111,847; Herman et al., J. Catal. (1979), 56, 407). All of these catalysts can be utilized in the temperature range of 200°-300° C. and a pressure range of 2-100 atm. with ternary synthesis gas mixtures.

Stable catalytic activity is maintained with $CO_2$ as the third component of the synthesis gas mixture. Examples of synthesis gas mixtures known in the art for production of methanol are: $CO_2/CO/H_2 = 10/15/75$ vol % (U.S. Pat. No. 3,326,956), $CO_2/CO/H_2/CH_4 = 12/7/55/26$ vol % where $CH_4$ is an inert diluent (Cornthwaite, British Patent 1,296,212), and $CO_2/CO/H_2 = 4.0/8.8/87.2$ mol % (Stiles, U.S. Pat. No. 4,111,847). In the absence of $CO_2$, all of the above systems undergo irreversible deactivation of the catalyst.

Of particular interest in the prior art of synthesizing methanol catalyst was the necessity of assuring that the materials used in catalyst formation were alkali free. For example, it has been stated that copper oxide/zinc oxide catalysts must contain less than 100 ppm of sodium. This level has been achieved by using ammonium carbonate or ammonium bicarbonate as the precipitating agent in the preparation of a catalyst from a metal nitrate solution. Sodium carbonate is typically used as the precipitating agent in forming the Cu/Zn/Al and Cu/Zn/Cr oxide catalysts. In these systems, the precipitated precursor is filtered and extensively water-washed to remove all alkali.

OBJECTIVES

The primary object of this invention is to provide a process and catalyst for the preparation of methanol from synthesis gas mixtures which are free of carbon dioxide.

A further object of this invention is to provide a process and catalyst for the preparation of methanol from synthesis gases containing carbon dioxide wherein such production is enhanced with respect to prior art catalytic processes.

Still a further object of this invention is to reduce the sensitivity of the methanol production process to variations in carbon dioxide and water concentrations in the synthesis gas.

SUMMARY OF THE INVENTION

It has been discovered that improved methanol synthesis catalysts can be made by the incorporation of certain alkali metal hydroxides into copper/zinc oxide based catalysts. These alkali doped catalysts exhibit enhanced productivity of methanol from synthesis gas mixtures that are free of carbon dioxide. However, small amounts of carbon dioxide added to this synthesis gas increase the degree of conversion of carbon monoxide to methanol. Therefore, the alkali-doped catalysts of this invention can be utilized with synthesis gas streams in which the carbon dioxide content can vary due to nonrigid control of the scrubbing of the $CO_2$ from the reactant gas stream. The novel catalyst of this invention can be used for methanol production from binary $CO_2$-free synthesis gas and from $CO_2$-containing synthesis gases for which the CO content may be less strictly controlled than for the catalysts known in the prior art. In addition, $H_2O$-containing synthesis gases can be utilized for methanol synthesis because the novel catalyst efficiently converts the $H_2O$ into $CO_2$ by the water gas shift reaction.

DESCRIPTION OF THE INVENTION

The novel catalysts of this invention that are useful for the methanol synthesis process $$CO + 2 H_2 \rightarrow CH_3OH \tag{1}$$

may involve any composition of Cu/ZnO, but the most preferred compositions are in the wt % range of $CuO/ZnO = 30/70$ to 67/33. These calcined catalysts are then reduced and doped with potassium hydroxide, rubidium hydroxide or cesium hydroxide under an inert atmosphere so that the alkali metal ion content is in the range of 0.01 to 1.0 to 1.0 mol % with respect to copper and zinc.

In accordance with the present invention, these catalysts are utilized in methanol synthesis reactors at 180°-300° C., 20-100 atm. pressure, and gas hourly space velocities (GHSV) of 1,000-200,000 liters of gas per liter of catalyst per hour with binary $H_2/CO$ synthesis gas mixtures having a wide range of compositions, for instance 95/5-30/70 vol % $H_2/CO$. The synthesis gas may contain inert diluents such as methane, nitrogen, or argon. The synthesis gas may also contain carbon dioxide without harmful effect to the methanol synthesis activity and, in fact, the activity toward the production of methanol will be somewhat enhanced by the presence of small amounts of carbon dioxide. However, the presence of carbon dioxide in the reactant synthesis gas stream is not necessary. The presence of water in the synthesis gas can also be tolerated because these catalysts very effectively convert the water into carbon dioxide by the water gas shift reaction $$H_2O + CO \rightarrow H_2 + CO_2. \quad (2)$$

An example of the catalyst of this invention is the CsOH/Cu/ZnO=0.43/29.87/69.70 % metal atom catalyst. To accomplish the preparation of the catalyst, the copper and zinc ions are co-precipitated from aqueous nitrate solution using 1.0M sodium carbonate as the precipitating agent. Although the nitrate salts are generally used, other salts such as acetates can also be utilized. The aqueous nitrate solution is heated to 30°–100° C. but preferably to 80°–90° C. and the carbonate solution is added dropwise to the stirred nitrate solution until a pH of 6.8 to 7.0 is achieved. To prepare 30 grams of catalyst, 1.5 liters of nitrate solution is typically used and the carbonate addition is carried out during a period of 1.5 hours. At the end of the addition, the solution is allowed to cool for 1–1.5 hours while maintaining slow to moderate continuous stirring. The solution is then decanted from the resultant catalyst precursor, which is washed with distilled water three times by decantation. A preferred composition and structure of the precursor is that of aurichalcite $Cu_{1.5}Zn_{3.5}(OH)_6(CO_3)_2$.

The precursor is then filtered, washed several times with water, and dried at 25°–95° C. The dried solid is calcined at 350° C. for three hours to convert the precursor to the copper and zinc oxides. The resultant powdered oxides can be pelletized by a variety of methods. Typically, the aqueous slurry is pressed into pellets which are dried and sieved to the desired size. Catalyst carriers, e.g. based on aluminum or chromium, can be incorporated into this preparation procedure.

The present invention involves the incorporation of certain alkali metal ions, e.g., cesium, in or on the Cu/ZnO catalyst material. This is carried out by reducing the CuO/ZnO pellets at ambient pressure at 250° C. in a stream of $H_2/N_2 = 2/98$ vol % gas. The flow of this gas mixture is typically 1.0–1.5 liters per hour per gram of catalyst. The reduction is carried out until water is nearly absent from the exit gas. After cooling to ambient temperature, the treated Cu/ZnO catalyst is removed from the reactor under an inert atmosphere and added to a nitrogen purged aqueous solution of cesium hydroxide at 50° C. The solution is then evaporated to dryness under flowing nitrogen. The doped catalyst is then reinserted into the reactor while still under an inert atmosphere. The catalyst thus prepared is particularly useful for the production of methanol from a binary synthesis gas containing hydrogen and carbon monoxide only. Other cesium compounds such as carbonate, formate, oxalate, and methoxide may be used for the preparation above.

The role of the alkali doping in the present invention is to moderate the conversion activity of the catalyst when $CO_2$ is present which provides for operation of the methanol synthesis reactor in a manner which approaches isothermal behavior and prevents temperature overshoots which cause catalyst deactivation as the carbon dioxide content of the synthesis gas fluctuates. Unlike the catalysts of the prior art, the absence of carbon dioxide from the synthesis gas will not cause an irreversible deactivation of the catalysts of the present invention but rather only a slight decrease in the conversion rate of carbon monoxide to methanol.

The invention is further illustrated by the following examples:

EXAMPLE 1

A Cu/ZnO catalyst, of composition CuO/ZnO=30/70 wt %, was prepared by dissolving the metal nitrate salts in water heated to 80° C., coprecipitation of the metal hydroxycarbonate precursors by the dropwise addition of 1.0M $Na_2CO_3$ to the solution until the pH increased to 6.8, filtration, washing, and air-drying of the light blue solid, and calcination using a step-wise procedure to achieve a final temperature of 350° C., which was maintained for 3 hr. The dark material was pelletized from an aqueous slurry, sieved to 10–20 Mesh, and 3.000 g was diluted with 7 ml of Pyrex beads and centered in the reactor. Reduction was carried out at 250° C. with a 2% $H_2$/98% $N_2$ gas mixture at ambient pressure and with a flow rate of 3.6 liters per hour until water was absent from the exit gas.

The reactor was cooled to ambient temperature, and the catalyst was removed from the reactor in a nitrogen filled glove bag. The reduced catalyst was added to 25 ml of a nitrogen-purged aqueous solution containing 0.0240 g of cesium hydroxide, and the solution was evaporated to dryness under flowing nitrogen. The CsOH concentration corresponds to the quantity needed to cover 16% of the catalyst surface, assuming uniform dispersion. The overall composition of the resultant catalyst was CsOH/Cu/ZnO=0.43/29.87/69.70 mol %. A 2.866 g portion of this catalyst was diluted with 7 ml of Pyrex beads and reinserted into the 316 stainless steel reactor.

At ambient temperature, the reactor was pressurized to 75 atm with a $H_2/CO=70/30$ vol % synthesis gas, and the flow rate (GHSV) was adjusted to 5000 liters of feed gas/liter of catalyst/hr ($hr^{-1}$). The reactor was heated to 250° C., and an initial 22.2% carbon monoxide conversion to methanol was observed, which corresponded to 14.2 mol/l of catalyst/hr. Hydrogenated side products, as shown in Table I, were methane, methyl formate, and ethanol. Water formed during the synthesis of these side products was efficiently converted into carbon dioxide so that it was not observed in the exit stream. The exit gas from the reactor was sampled approximately every 20 minutes using an automated, heated sampling valve and analyzed using an on-line gas chromatograph that was coupled with an integrator/controller unit.

The catalyst was subjected to an accelerated deactivation test in $CO/H_2$ at temperatures of 250°–288° C. for 132 hr. The reaction conditions were then set at 250° C., $CO/H_2 = 30./70$, 75 atm, GHSV 5000, and the methanol yield was found to be 457.8 g/kg catalyst/hr. Therefore, within experimental error, no change in catalytic activity in converting the binary $H_2/CO$ synthesis gas to methanol occurred (see Table I).

Table I

Initial yields of products (g/kg catalyst/hr) at 250° C., 75 atm pressure, and GHSV=5000 $hr^{-1}$ (STP) with $H_2/CO=70/30$ vol % synthesis gas over 2.866 g of CsOH/Cu/ZnO catalyst

| Exit Gas Component | Content (g/kg/hr) |
|---|---|
| Carbon Monoxide | 1368.4 |
| Carbon Dioxide | 4.61 |
| Methane | 1.67 |

| Exit Gas Component | Content (g/kg/hr) |
| --- | --- |
| Methanol | 455.6 |
| Methyl formate | 6.28 |
| Ethanol | 1.61 |

EXAMPLE 2

A Cu/ZnO catalyst not within the scope of this invention was prepared for comparison purposes.

The Cu/ZnO=30/70 mol % catalyst was prepared as described in Example 1, except no alkali doping procedure was carried out. A 2.460 g portion (3.0 ml) of the binary catalyst was diluted with 7 ml of Pyrex beads and centered in the reactor. The reduction treatment and subsequent catalytic testing at 250° C with the binary $H_2/CO$ synthesis gas described in Example 1 were carried out. The data obtained for the initial catalytic activity are presented in Table II, and these correspond to a 11.3% conversion of carbon monoxide to methanol.

Table II

Initial yields of products (g/kg catalyst/hr) at 250° C., 75 atm pressure, and GHSV=5000 $hr^{-1}$ (STP) with $H_2/CO$=70/30 vol % synthesis gas over 2.460 g of binary Cu/ZnO catalyst

| Exit Gas Component | Content (g/kg/hr) |
| --- | --- |
| Carbon Monoxide | 1885.2 |
| Carbon Dioxide | 6.28 |
| Methane | <0.1 |
| Methanol | 240.3 |
| Methyl formate | <0.1 |
| Ethanol | <0.1 |

The catalyst was subjected to an accelerated deactivation test in $CO/H_2$ at temperatures of 250°–288° C. for 96 hr. After returning to the conditions stated in Table II, the methanol yield was observed to be 206.4 g/kg catalyst/hr. This represents an appreciable deactivation of the unpromoted binary catalyst in the carbon dioxide-free synthesis gas compared to the Cs-doped catalyst. This example also demonstrates that the known binary Cu/ZnO catalyst possesses only about half of the catalytic activity of that shown by the new exemplary doped Cs/Cu/ZnO catalyst of this invention in converting binary $H_2/CO$ synthesis gas to methanol.

EXAMPLE 3

A Cu/ZnO=30/70 mol % catalyst was prepared as described in Example 1, and it was reduced using the same procedure. After reaching ambient temperature, the catalyst was removed from the reactor in a nitrogen filled glove bag and added to 25 ml of a nitrogen-purged aqueous solution containing 0.0090 g of potassium hydroxide. The solution was evaporated to dryness under flowing nitrogen, and a 2.620 g portion of the prepared catalyst was diluted with 7 ml of Pyrex bead and repositioned in the reactor. The resultant catalyst had a composition of KOH/Cu/ZnO=0.43/29.87/69.70 mol %.

Testing for methanol synthesis activity was carried out at 250° C. as described in Example 1. An initial steady-state conversion of 13.9% of the carbon monoxide into methanol was observed. The data for this test are presented in Table III.

Table III

Initial yields of products (g/kg catalyst/hr) at 250° C., 75 atm pressure, and GHSV=5000 $hr^{-1}$ (STP) with $H_2/CO$=70/30 vol % synthesis gas over 2.620 g of KOH/Cu/ZnO catalyst

| Exit Gas Component | Content (g/kg/hr) |
| --- | --- |
| Carbon Monoxide | 1687.3 |
| Carbon Dioxide | 4.27 |
| Methane | <0.1 |
| Methanol | 313.4 |
| Methyl formate | <0.1 |
| Ethanol | <0.1 |

EXAMPLE 4

A Cu/ZnO=30/70 mol % catalyst was prepared and reduced as described in Example 1. The catalyst was then doped by removing it from the reactor in a nitrogen-filled glove bag and adding it to 25 ml of a nitrogen-purged aqueous solution containing 0.0164 g of rubidium hydroxide. After evaporating the solution to dryness under flowing nitrogen, a 2.480 g portion of the resultant RbOH/Cu/ZnO=0.43/29.87/69.70 mol % catalyst was diluted with 7 ml of Pyrex beads and centered in the reactor.

The methanol synthesis activity of this doped catalyst was determined at 250° C. as described in Example 1, and the resultant data are given in Table IV. A 16.1% initial steady-state conversion of carbon monoxide to methanol was observed.

Table IV

Initial yields of products (g/kg catalyst/hr) at 250° C., 75 atm pressure, and GHSV=5000 $hr^{-1}$ (STP) with $H_2/CO$=70/30 vol % synthesis gas over 2.480 g of RbOH/Cu/ZnO catalyst

| Exit Gas Component | Content (g/kg/hr) |
| --- | --- |
| Carbon Monoxide | 1748.2 |
| Carbon Dioxide | 4.66 |
| Methane | 3.79 |
| Methanol | 382.8 |
| Methyl formate | 2.93 |
| Ethanol | <0.1 |

EXAMPLE 5

A CsOH/Cu/ZnO=0.43/29.87/69.70 mol % catalyst was prepared as described in Example 1. After being reloaded into the reactor, the system was pressurized to 75 atm with $H_2/CO$=70/30 vol % synthesis gas and the flow rate was adjusted to GHSV=5000 $hr^{-1}$. The reactor was heated to 235° C., and a steady state 13.7% carbon conversion to methanol was established. Maintaining the same flow rate, the composition of the synthesis gas mixture was altered to yield a $CO_2/CO/H_2$=1.9/27.2/70.9 vol % reactant gas stream. This ternary synthesis gas produced a 22.4% carbon conversion to methanol during a testing period of 24 hr. Maintaining the otherwise identical experimental conditions, the synthesis gas stream was altered to a $CO_2/CO/H_2$=6.0/22.5/71.5 vol % mixture. During a period of 40 hr., the latter synthesis gas yielded a steady state 17 0% carbon conversion to methanol.

The experimental results are tabulated in Table V, along with those obtained with a binary Cu/ZnO catalyst that is not within the scope of this invention.

Table V

Effect of carbon dioxide in the synthesis gas on the carbon conversion to methanol at 235° C., 75 atm pressure, and GHSV=5000 hr$^{-1}$ (STP) over the novel CsOH/Cu/ZnO and the known Cu/ZnO catalysts

| Gas Composition | % Carbon Conversion to Methanol | |
|---|---|---|
| ($CO_2$/CO/$H_2$ vol %) | CsOH/Cu/ZnO | Cu/ZnO |
| 0/30/70 | 13.7 | 9.0 |
| 2/28/70 | 22.4 | 51.0 |
| 6/24/70 | 17.0 | 37.0 |

It is evident from Table V that the cesium doping has caused enhanced catalytic activity to the Cu/ZnO catalyst in the binary $H_2$/CO synthesis gas. It is also evident that the doping has moderated the fluctuations in CO conversion caused by the variations of carbon dioxide concentrations in the synthesis gas. This moderating ability of the catalyst is a valuable property since the formation of methanol from synthesis gas (equation 1) is a highly exothermic reaction. In industrial practice, altering the carbon dioxide content of the synthesis gas from approximately zero to about 2 vol % or from a higher value such as 6 vol % to approximately 2 vol % would provoke a large heat release in the reactor that could easily produce hot spots (>300° C.) that would cause deactivation of the catalyst by a sintering process.

The novel cesium doped catalyst of this invention inhibits sudden heat release by the catalyzed chemical reaction involved in methanol synthesis. In addition, water carried into the reactor as damp synthesis gas or generated in the reactor by chemical synthesis reactions is converted to carbon dioxide, which can be separated more easily from the product methanol than water and which can be recycled to the reactor if desired.

While this invention has been described with reference to specific embodiments thereof, it is not considered to be limited thereto. Accordingly, the appended claims are intended to be construed to encompass not only those forms and embodiments of the invention specifically described or generally referred to herein but to such other embodiments and forms of the invention as may be devised by those skilled in the art without departing from the true spirit and scope of the present invention.

What is claimed is:

1. A process for carrying out the water gas shift reaction in the presence of carbon monoxide and water in contact with a catalyst system selected from one of an alkaline, binary, and ternary alkalized catalyst consisting essentially of metallic copper dispersed in zinc oxide, copper dispersed in zinc oxide and chromium oxide, or copper dispersed in zinc oxide and aluminum oxide, said catalyst including a dopant comprising one or more alkali metals selected from the group of cesium, rubidium and potassium.

* * * * *